United States Patent [19]

Shimojo et al.

[11] 3,997,479
[45] Dec. 14, 1976

[54] METHOD OF REDUCING THE EVAPORATION OF PB DURING THE MANUFACTURE OF BARIUM TITANATE (PB SUBSTITUTED) SEMICONDUCTING CERAMICS

[75] Inventors: Nobuei Shimojo, Ichikawa; Ichihito Minesaki, Yokohama, both of Japan

[73] Assignee: TDK Electronics Company, Limited, Tokyo, Japan

[22] Filed: July 30, 1974

[21] Appl. No.: 493,155

[30] Foreign Application Priority Data

July 30, 1973 Japan .............................. 48-84974

[52] U.S. Cl. .............................. 252/520; 252/521; 106/73.31
[51] Int. Cl.² ........................................ H01B 1/08
[58] Field of Search ............... 252/512, 520, 521; 106/73.31

[56] References Cited

UNITED STATES PATENTS

| | | | |
|---|---|---|---|
| 3,474,043 | 10/1969 | Andersen et al. | 252/520 |
| 3,490,927 | 1/1970 | Kahn et al. | 106/73.31 |
| 3,533,966 | 10/1970 | Moratis | 252/520 |
| 3,586,642 | 6/1971 | Matsuo et al. | 252/520 |
| 3,637,532 | 1/1972 | Ramisch et al. | 252/520 |

*Primary Examiner*—Benjamin R. Padgett
*Assistant Examiner*—E. Suzanne Parr
*Attorney, Agent, or Firm*—Staas & Halsey

[57] ABSTRACT

A method of manufacturing barium titanate semiconducting ceramics having a positive temperature coefficient characteristic of resistivity in which a composite, expressed by a general formula $(Ba_{1-x-y}Pb_xR_y) TiO_3$ (where $0 < x \leq 0.8$, $y$ is the remainder and R represents a rare earth element) is mixed with either tantalum or niobium or both in the amount of 0.05 to 0.5 atomic % and fired in the air or in an atmosphere containing oxygen, the total amount of the rare earth in the composite combined with the total amount of tantalum or niobium or both added thereto being in the range of 0.1 to 0.55 atomic %. The addition of tantalum and/or niobium in this manufacturing method prevents the evaporation of lead from the composite and eliminates the need to employ a lead oxide gas atmosphere while providing semiconducting ceramics having stable and excellent ceramic and electrical characteristics.

8 Claims, 3 Drawing Figures

METHOD OF REDUCING THE EVAPORATION OF PB DURING THE MANUFACTURE OF BARIUM TITANATE (PB SUBSTITUTED) SEMICONDUCTING CERAMICS

BACKGROUND OF THE INVENTION

1. Field of the Invention

This invention relates to a method of manufacturing lead barium titanate (Ba,Pb)TiO$_3$ semiconducting ceramics having a positive temperature coefficient characteristic of resistivity.

2. Description of the Prior Art

In the prior art, semiconducting ceramics having a positive temperature coefficient characteristic of resistivity are produced by adding a very small amount of a rare earth element, antimony or bismuth to a barium titanate (BaTiO$_3$) composite to make the composite semiconducting and the semiconducting ceramics thus obtained are employed as a heat sensitive element, a current limiting element, etc. It is also known in the art that, by substituting one part of barium in the barium titanate (BaTiO$_3$) with lead, the temperature range in which the barium titanate (BaTiO$_3$) semiconducting ceramics exhibit the positive temperature coefficient characteristic of resistivity can be shifted higher than 120° C.

However, firing at a high temperature above 1250° C is necessary for making this kind of composite semiconducting, so that, in the fabrication of (Ba,Pb)TiO$_3$ semiconducting ceramics, firing in the air leads to evaporation of lead changing the basic composition, and making it impossible to obtain semiconducting ceramics of stable and desired characteristics. When the amount of lead substituted for the barium is in excess of 10 atomic %, such evaporation of lead rapidly increases and, in addition, many pores are formed in the surfaces of the semiconducting ceramics. Hence, this conventional method is impractical. To avoid these defects, methods such as firing in a lead oxide gas atmosphere have been proposed. However, such conventional methods substantially lower the resistivity changing ratio of the positive temperature coefficient characteristic of resistivity of the semiconducting ceramics or introduce considerable variations in their electrical characteristics, so that they are not suitable for large scale manufacture. Further, even if the amount of lead substituted for the barium is less than 10 atomic %, a little evaporation of lead is unavoidable, which is the primary cause of the variations in the electrical characteristics of the semiconducting ceramics.

For preventing evaporation of lead, it has been proposed to carry out firing in the atmosphere of an inert gas, for example, N$_2$. However, where a ceramic material composed of (Ba$_{0.6}$Pb$_{0.4}$)TiO$_3$ and mixed with a very small amount of Y$_2$O$_3$ was fired in the atmosphere of N$_2$ gas, the point of abnormal change of resistivity relative to temperature disappeared as shown in FIG. 3 preventing the desired objects from being attained.

SUMMARY OF THE INVENTION

An object of this invention is to provide a method of manufacturing semiconducting ceramics of excellent ceramic and electrical characteristics by ordinary firing in the air thereby eliminating the need for any special firing method.

To attain the above object, the method of manufacturing semiconducting ceramics having a positive temperature coefficient characteristic of resistivity according to this invention embodies the provision of a composite, expressed by a general formula (Ba$_{1-x-y}$Pb$_x$R$_y$)TiO$_3$ (where $0 < x \leq 0.8$, $y$ is the remainder and R represents a rare earth element) which is mixed with 0.05 to 0.5 atomic % of either tantalum or niobium or both and the mixture is fired in the air or in an atmosphere containing oxygen.

Another object of this invention is to provide a new and novel semiconducting ceramic having a positive temperature co-efficient characteristic of resistivity.

DESCRIPTION OF THE PREFERRED EMBODIMENTS

Figure 1:
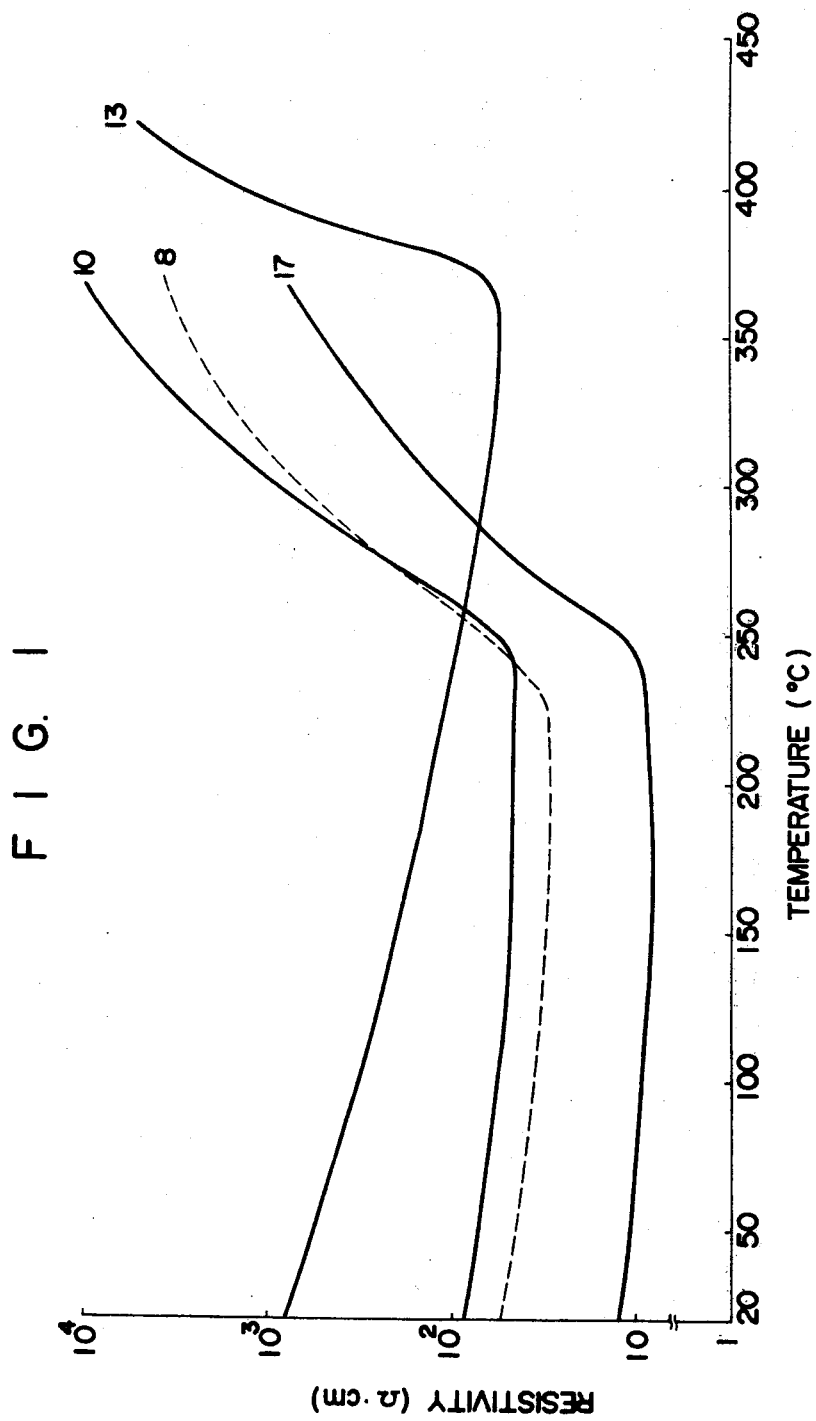
FIG. 1 is a graph showing temperature coefficient characteristics of resistivity of semiconducting ceramics in accordance with various examples of this invention wherein either tantalum or niobium or both are added to a (B$_a$, P$_b$, Y)TiO$_3$ composite prepared in accordance with the invention.

Examples of this invention will now be described.

Industrial raw materials on the market including BaCO$_3$, TiO$_2$, PbO, Y$_2$O$_3$, SiO$_2$, Ta$_2$O$_5$ and Nb$_2$O$_5$ were used as starting materials and were selected and blended to provide the composites shown in the following Table 1. Each composite was subjected to wet mixing by means of a pot mill lined with polyethylene for about 20 hours and dried and dehydrated, thereafter calcined at about 1100° C for about 2 hours. The mixture thus calcined was pulverized and mixed with an aqueous solution of polyvinyl alcohol as a bonding agent and then granulated. Then, it was pressed under a pressure of about 1000kg/cm$^2$ and formed into a shaped element such as a disc about 13mm$\phi$ in diameter and about 3mm thick. The disc thus formed was placed on a plate of zirconia and fired in the air. The firing temperature was 1250° to 1400° C and held for 0.5 to 1 hour. The ceramics thus obtained were non-electrolytically plated over both surfaces with a nickel (Ni) alloy to provide electrodes thereon. A film of silver was coated on the surface of each electrode of some of the specimens to make them heat-proof.

Table 1

| specimen No. | Basic composition | Amount of Ta or Nb (atomic % relative to basic composition) | | Firing Temperature (°C) | Resistivity at room temperature ($\Omega$cm) | Note |
|---|---|---|---|---|---|---|
| 1 | $(Ba_{0.695}Pb_{0.3}Y_{0.005})TiO_3$ | | 0 | 1300 | $5.8 \times 10^5$ | Pores were formed in the surfaces of the ceramics. (1 & 2) |
| 2 | '' | Ta | 0.045 | '' | $6.1 \times 10^2$ | |
| 3 | '' | | 0.05 | '' | $3.1 \times 10^2$ | |
| 4 | '' | | 0.1 | '' | $4.2 \times 10$ | |
| 5 | '' | | 0.4 | '' | $9.5 \times 10^5$ | |
| 6 | '' | | 0.55 | '' | above $10^7$ | |
| 7 | $(Ba_{0.699}Pb_{0.3}Y_{0.001})TiO_3$ | | 0 | 1300 | $1.3 \times 10^2$ | Pores were formed in the surfaces of the ceramics. (7 & 8) |
| 8 | '' | Ta | 0.045 | '' | $5.5 \times 10$ | |
| 9 | '' | '' | 0.1 | '' | $1.6 \times 10$ | |
| 10 | '' | '' | 0.2 | '' | $8.5 \times 10$ | |
| 11 | '' | '' | 0.35 | '' | $9.6 \times 10^5$ | |
| 12 | '' | '' | 0.5 | '' | above $10^7$ | |
| 13 | $(Ba_{0.399}Pb_{0.6}Y_{0.001})TiO_3$ | '' | 0.25 | 1280 | $8.0 \times 10^2$ | |
| 14 | $(Ba_{0.099}Pb_{0.9}Y_{0.001})TiO_3$ | '' | 0.25 | 1250 | — | The surfaces of the ceramics were greatly rough (14). |
| 15 | $(Ba_{0.698}Pb_{0.3}Y_{0.002})TiO_3$ | | 0 | 1300 | $1.6 \times 10$ | |
| 16 | '' | Ta | 0.1 | '' | $1.3 \times 10$ | |
| 17 | $(Ba_{0.699}Pb_{0.3}Y_{0.001})TiO_3$ | Nb | 0.1 | '' | $1.2 \times 10$ | Pores were formed in the surface of the ceramics (15). |
| 18 | '' | Nb | 0.1 | '' | $9.3 \times 10^5$ | |
| | | Ta | 0.25 | | | |
| 19 | '' | '' | 0.5 | '' | above $10^7$ | |
| 20 | Basic composition $(Ba_{0.699}Pb_{0.3}Y_{0.001})TiO_3$ Additive: atomic % $SiO_2$: 0.2 | Ta | 0.2 | 1300 | $9.0 \times 10$ | |

A DC voltage 1 to 3V was applied to each of the semiconducting specimens to measure its resistivity at room temperature and the measured values are also shown in the Table 1. In the Table 1, specimens 3 to 5, 9 to 11, 13, 16 to 18 and 20 are those within the scope of this invention. In specimens 1, 2, 7, 8 and 15, tantalum or niobium was not added or, if added; the amount added was very small, so that many pores were formed in the surfaces of the ceramics. Accordingly, it is desirable that the amount of tantalum or niobium added exceeds 0.05 atomic %. Since specimens 6, 12 and 19 contained a large total amount of tantalum or niobium and the rare earth element Y, their resistivity at room temperature was extremely high and no positive temperature coefficient characteristic of resistivity was obtained. The ceramic produced with barium substituted with lead in an amount of 90 atomic % (specimen 14) had rough surfaces and no accurate resistivity could be measured.

FIG. 1 is a graph showing the temperature coefficient characteristics of resistivity of specimens 8, 10, 13 and 17 in the Table 1. In FIG. 1, although specimens 8 and 10 are of the same basic composition, specimen 8 is outside of the scope of this invention, and its resistivity abnormality starting temperature is further to left than that of specimen 10. This is considered to be caused by a change in the composition of specimen 8.

Also, specimen 20, of which contains an additive ($SiO_2$) in an amount that does not impede making the ceramics semiconducting, the lead evaporation preventing effect provided by the tantalum or niobium in the manufacture of the (Ba, Pb)$TiO_3$ semiconducting ceramics does not change. Further, in the example of specimen 18 wherein both tantalum and niobium are added, if the combined amount is within the range of 0.05 to 0.5 atomic %, the resulting effect was the same as that obtainable with the addition of one of them.

Figure 2:
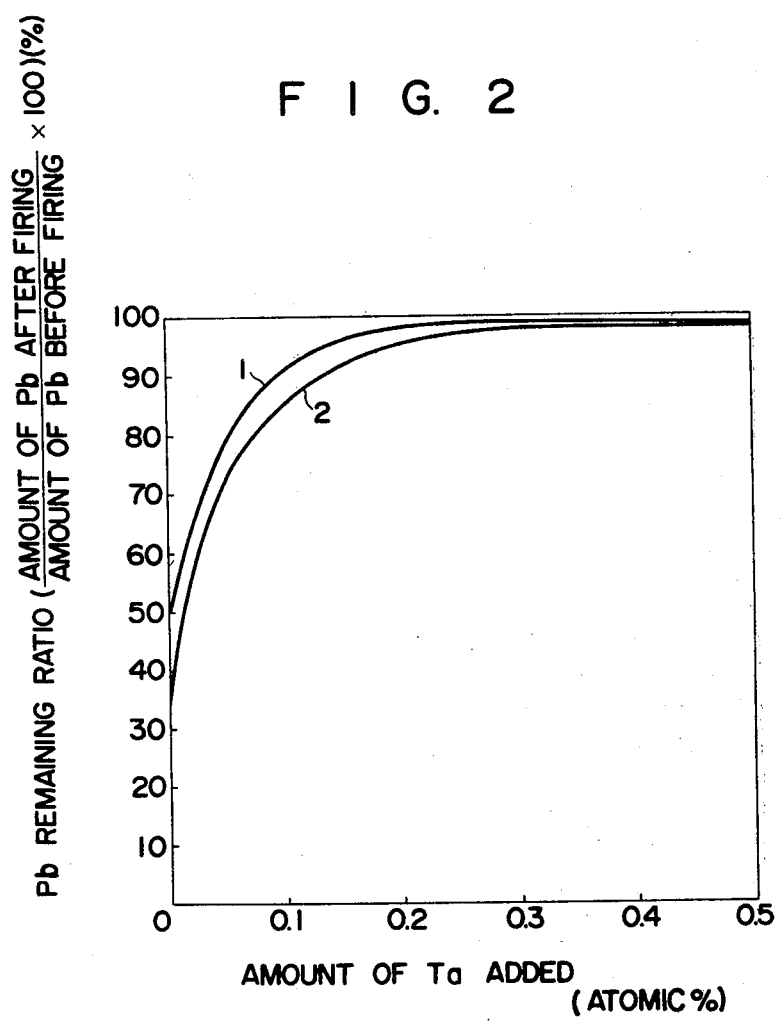
FIG. 2 is a graph showing the remaining ratio of lead in the semiconducting ceramics of the invention where (B$_a$, P$_b$, Y)TiO$_3$ composites were mixed with tantalum and fired in the air.
Figure 3:
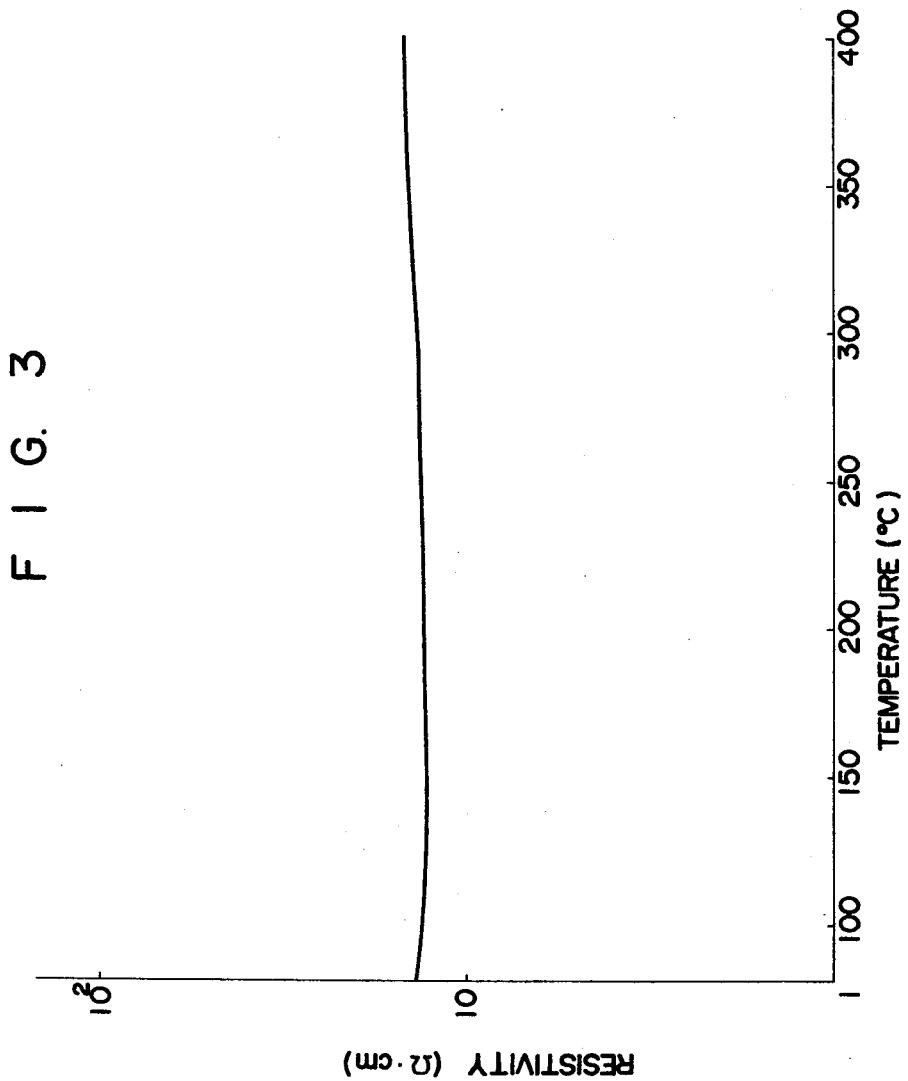
FIG. 3 is a graph showing the relationship between resistivity and temperature in the case where a (Ba$_{0.6}$Pb$_{0.4}$)TiO$_3$ composite mixed with a very small amount of Y$_2$O$_3$ was fired in an atmosphere of N$_2$ gas.

In FIG. 2, the curves 1 and 2 show the lead remaining ratios $$\left( \frac{\text{amount of Pb after firing}}{\text{amount of Pb before firing}} \times 100 \right)$$

wherein $(Ba_{0.699}Pb_{0.3}Y_{0.001})TiO_3$ and $(Ba_{0.199}Pb_{0.8}Y_{0.001})TiO_3$ composites mixed with $Ta_2O_5$ were fired in the air at 1250° to 1300° C for 0.1 to 1 hour, respectively.

As is apparent from FIG. 2, where tantalum is not added, lead is evaporated up to a maximum of 65% but where the amount of tantalum added is in excess of 0.05 atomic %, evaporation of lead is substantially reduced to a maximum of less than 30%. It is also seen that evaporation of lead can be reduced down to about 1% of the lead originally contained in the composite.

Further, it is also apparent that evaporation of lead can be prevented by increasing the amount of tantalum or niobium added when there is an increase in the amount of lead substituted for barium.

As has been described in the foregoing, in order to obtain excellent electrical characteristics in a semiconducting ceramic of barium titanate mixed with a rare earth element by shifting the temperature range of its positive temperature coefficient characteristic of resistivity to the side higher than 120° C, barium atoms are partly substituted with lead atoms up to 80 atomic % and either of tantalum or niobium or both are added in the amount of 0.05 to 0.5 atomic % and firing is carried out in the air or in an oxidizing atmosphere. It is preferred that, in mixture to be fired the total amount of the rare earth element and tantalum and niobium be maintained in the range of 0.1 to 0.55 atomic %.

The semiconductor ceramics thus obtained by the method of this invention are excellent ones whose surfaces have no pores and are smooth, and exhibit the positive temperature coefficient characteristic of resistivity in the temperature range higher than 120° C. Accordingly, the ceramics can be widely used as elements for current limiting, constant-temperature heating, temperature detecting, etc. Further, also in large scale industrial manufacture, by ordinary firing in the natural atmosphere, it is possible to produce at low cost semiconducting ceramics which are stable in composition and low in dispersion in the electrical characteristics.

It will be apparent that many modifications and variations may be effected without departing from the scope of the novel concept of this invention.

What is claimed is:

1. A method of making semiconducting ceramics having a selected positive temperature coefficient of resistivity comprising the steps of:
    providing a composite material consisting of a composition, having the formula $(Ba_{1-x-y}Pb_xR_y) TiO_3$ (where $0 < x \leq 0.8$, $y$ is the remainder and R represents a rare earth element, and an additive material containing at least one of the elements Nb and Ta in an amount within the range of approximately 0.05 to 0.5 atomic %, wherein the total amount of R and said at least one of said elements of said additive material is within the range of approximately 0.1 to 0.55 atomic %;
    forming said composite material into a shaped element; and
    firing said shaped element at 1250° to 1400° C for 0.5 to 1 hour in air to produce said ceramic.

2. A method in accordance with claim 1, wherein said additive material contains both Nb and Ta in a total amount within said range of approximately 0.05 to 0.5 atomic %.

3. A method in accordance with claim 1 wherein R comprises yttrium.

4. A method in accordance with claim 3, wherein the amount of yttrium in said composite material is within the range of approximately 0.001 to 0.002 molar ratio of said composite material.

5. A semiconducting ceramic having a positive temperature coefficient characteristic of resistivity comprising a shaped element formed from a composite material including a composition having the formula $(Ba_{1-x-y}Pb_xR_y) TiO_3$ (where $0 < x \leq 0.8$, $y$ is the remainder and R represents a rare earth element, and an additive material containing at least one of the element Nb and Ta in an amount within the range of approximately 0.05 to 0.5 atomic %, wherein the total amount of R and said at least one of said elements of said additive material is within the range of approximately 0.1 to 0.55 atomic %.

6. A semiconducting ceramic in accordance with claim 5 wherein said additive material includes both Nb and Ta in a total amount within said range of approximately 0.05 to 0.5 atomic %.

7. A semiconducting ceramic in accordance with claim 5 wherein R comprises yttrium.

8. A semiconducting ceramic in accordance with claim 5, wherein said composite material also includes a material containing Si intimately mixed therein in an amount wherein said Si is approximately 0.2 atomic %.

* * * * *